United States Patent Office 3,636,214
Patented Jan. 18, 1972

3,636,214
CERTAIN SUBSTITUTED 1,3 DIKETONES AS
SOIL FUNGICIDES
Elton L. Clark, Brookeville, Md., assignor to
W. R. Grace & Co.
No Drawing. Continuation-in-part of application Ser. No. 754,971, Aug. 23, 1968. This application July 3, 1969, Ser. No. 846,625
Int. Cl. A01n 9/12
U.S. Cl. 424—245      1 Claim

ABSTRACT OF THE DISCLOSURE

A soil fungicide and a method for protecting seeds and seedlings from attack by pathogenic organisms which inhabit soil is disclosed which comprises applying an effective amount of selective, substituted 1,3 diketones having the general formula $$R-\overset{O}{\underset{\|}{C}}-CH_2-\overset{O}{\underset{\|}{C}}-R_1X_m$$

wherein R represents the following groups

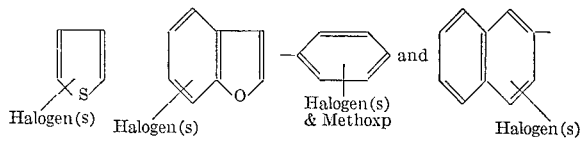

and $R_1$ represents an alkylene radical containing from 1 to 3 carbon atoms, X is selected from the group consisting of chlorine, bromine, fluorine and iodine, and $m$ is an integer from 1 through 7. The diketone can be applied as such or as the metal chelate.

---

This application is a continuation-in-part of my application S.N. 754,971, now abandoned filed Aug. 23, 1968.

This invention relates to the protection of seeds and seedlings from soil-borne organisms, and more particularly to a method for protecting seeds and seedlings from attack by various pathogenic organisms which inhabit soil.

As is well known in the art, soil-borne organisms cause decay of crop seeds, damping off of young plants, etc. and are responsible for large agricultural losses. In recent years, many compounds have been employed to protect seeds, developing seedlings, and vegetative transplants fram attack by soil organisms, particularly soil fungi. For example, mercury compounds are used to control seed-borne organisms. Though many fungicides have been proposed and have achieved to some extent, commercial exceptance, no completely satisfactory soil fungicide has been provided. In this regard, e.g., it has been found, that in the employment of presently known fungicides, levels of treatment sufficient to protect the seds from the pathogens also adversely affect the seeds themselves (i.e. exhibit phytotoxicity).

Accordingly, it is a general object of this invention to provide an improved process for protection of seeds and seedlings from soil-borne pathogens.

Another and more particular object is to provide seed protection compositons which exhibit little or no phytotoxicity.

Yet another object is to provide fungicidal compositions for the treatment of seeds and seedlings to protect them from soil-borne microorganisms.

In summary, the present invention is based on the discovery that selected, substituted 1,3 diketones having the general formula $$R-\overset{O}{\underset{\|}{C}}-CH_2-\overset{O}{\underset{\|}{C}}-R_1X_m$$

wherein R represents the following radicals

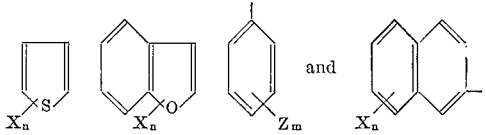

wherein X is selected from at least one of the group consisting of chlorine, bromine, fluorine and iodine and $n$ is a number from 0–4; wherein Z is a member selected from the group consisting of chlorine, bromine, fluorine, iodine and methoxy and wherein $m'$ is a number from 0–5 and wherein $R_1$ represents an alkylene radical containing from 1–3 carbon atoms, and X is selected from the group consisting of chlorine, bromine, fluorine, and iodine and $m$ is an integer from 1 through 7, are extremely effective and useful soil fungicides with extended residual activity against a wide range of plant pathogenic organisms which cause extensive damage to agronomic planting of seeds or vegetative transplants. The selected, substituted 1,3-diones are known to be useful as chelating agents but prior to the present invention, it was not known that they possess outstanding soil and seed fungicidal activity. The said 1,3-diones can be used as such or in the form of metal chelates. In many cases the chelate form provides comparatively greater activity than the unchelated form. The copper chelates are especially active.

The substituted compounds of the present invention form effective soil and/or seed fungicidal compositions when formulated with any of the relatively inert adjuvants and carriers normally employed for facilitating the dispersion of active ingredients in agriculture applications. They may be used alone or in combination with other fungicides or insecticides.

The fungicidal compositions of the present invention may be employed in the form of dusting preparations or solutions, wettable powders, emulsions, dispersions, concentrates, etc. The usual useful dosage, as to be described in more detail hereinafter, is approximately 0.5 to 200 pounds per acre, when used as a soil fungicide depending upon the method of application and when used as a seed treatment fungicide the useful dosage is approximately .05 to 5 lbs. per 100 lbs. of seed depending on the seed being treated.

In the preparation of dust compositions, the compounds are dispersed in or on a finely solid such as talc, chalk, gypsum, bentonite, fuller's earth, attapulgite, other clays and the like. In such operations, the finely divided carrier is mixed or wet with the toxicant or a solution thereof in a volatile organic solvent. Depending upon the proportion of ingredients, these dust compositions may be employed as concentrates and subsequently diluted with additional solid carriers such as talc, chalk, gypsum and the like, to obtain the desired amount of active ingredient in a composition adapted to be distributed in soil or applied to seeds. Also such concentrate dust compositions may be dispersed in water, with or without the aid of a dispersing agent to form aqueous soil treatment compositions.

Wettable powders are finely divided particles which disperse readily in water or other dispersant. The wettable powder is ultimately applied to the soil or to the seed either as a dry dust or as a suspension in water or other liquid. Typical carriers for wettable powders includes fuller's earth, kaolin clays, and other highly absorbent, readily wettable inorganic diluents.

Other useful formulations for soil fungicidal applications are emulsions or emulsifiable concentrates, which are homogeneous liquid or paste compositions that are dispersed in water or other dispersants, and may consist entirely of the substituted 1,3 diketones with an emulsifying agent, or may also contain, a liquid carrier, such as xylene, heavy aromatic naphthas, and other organic solvents.

Typical wetting, dispersing or emulsifying agents used in agricultural formulations include, for example, the alkyl and alkylaryl sulfonates and sulfates and their sodium salts; alkylamide sulfonates, alkylaryl polyether alcohols; polyvinyl alcohols, polyethylene oxides; sulfonated animal and vegetable oil; sulfonated petroleum oils; fatty acid esters of polyhydric alcohols and the ethylene oxide addition products of such esters; and the addition products of long chain mercaptans and ethylene oxide. Many other types of useful surface active agents are available in commerce. Other useful formulations include simple solutions of the active ingredient in a dispersant such as water or an organic solvent in which it is completely soluble at the desired concentration. Granular formulations wherein the toxicant is carried on relatively coarse particles, are of particular utility for application directly into the seed furrow at planting time.

The distribution of an effective fungicidal dosage in the soil or growth medium is essential for the practice of the present invention. In field applications, the compounds of the present invention may be applied to and mixed with the soil at a dosage of from about 0.5 to 200 lbs. per acre. While the fungicides of the present invention may be distributed through the soil as a dust, etc., the fungicidal compositions may be applied directly to the seeds as solid dust formulations, emulsifiable concentrates, liquid formulations, etc. When the compositions of the present invention are applied directly to the seeds they are generally applied to the seeds at a rate of from .05 to 5 lbs. of the substituted 1,3 diones per 100 lbs. of seeds, although greater or lesser rates of application may be desirable depending upon the particular seeds and field conditions encountered.

The active fungicidal compositions of the present invention may be prepared in accordance with known techniques, such as by the procedure disclosed by Moore & Levine, Journal Organic Chemistry, 29, 1442 (1964). The preparation of 1,3 diketones (by the condensation of a ketone with a carboxylic ester in the presence of sodium ethoxide) is disclosed, e.g., in Chemistry of Carbon Compounds, vol. IA, page 721+.

In practicing the instant invention, the soil or growth media may be treated with the active, 1,3 diketones in any convenient fashion, e.g., as by simple mixing in the growth medium or by applying the fungicide (in a suitable formulation as described above) to the surface of the soil and thereafter dragging or discing into the soil to the desired depth. The active compositions may be applied directly to the seeds by merely mixing the seeds with the solid dust formulations or by spraying the seeds with the liquid formulations, etc., in accordance with known techniques.

The following examples serve to further illustrate the present invention, but are not intended to limit it thereto.

EXAMPLE 1

A 25% wettable powder formulation was prepared by thoroughly mixing 25 parts of 4,4,4-trifluoro-1-phenyl-1,3-butanedione (composition 1) with 75 parts of attapulgite clay. These organisms, including Rhizoctonia, Sclerotium, Fusarium and Pythium were individually raised in sterile cultures on vermiculite and were then mixed with autoclaved soil to which had been added 10% by weight of corn meal. The composition of the indivdiual test media was 80% sterile soil, 10% corn meal and 10% disease organism on vermiculite. These media were aliquoted in 120 gms. quantities into two paper container replicates. Chemical treatment was accomplished by drenching each container with 10 ml. of an aqueous suspension of the wetting powder formulation. The chemical concentration of the drench was adjusted so that a dosage of 50 p.p.m. active ingredient, based on the weight of the treated soil, was achieved. All treated containers were then maintained in a cabinet at 68° F. and 90–95% relative humidity for 4 days. Fungicidal activity was rated by observation of the treated soil. In the absence of fungicidal control, masses of white mycelium developed on the soil surface. Lack of such growth was used as an indicator of fungal control. Based on the extent and vigor of mycelial development, each treatment was assigned a numerical rating on a scale from 0 to 5, in which 0 indicates no disease control (or dense mycelial growth) and 5 indicates 100% control (or no mycelial growth).

The rating of all replicates and organisms are totaled to give "total control points." Thus, a completely effective compound (or a sterile control) would have a total of 40 control points; a completely ineffective compound, 0. Commercially available fungicides usually give totals of 12 to 18 in this test.

4,4-trifluoro-1-phenyl-1,3-butanedione gave the following results:

Rhizoctonia _____ 3,3
Sclerotium _____ 3,3
Fusarium _____ 3,3
Pythium _____ 3,3
    Total control points=24

EXAMPLE 2

The procedure of Example 1 was repeated except for the substitution of the following compositions for that of Composition 1.

Composition
  No.:
  2—Heptafluoro-1-[2-(5-chloro)thienyl]-1,3-hexanedione
  3—4,4,4-trifluoro-1-[2-(5-bromo)thienyl]-1,3-butanedione
  4—4,4,4 - trichloro-1-(-chlorophenyl)-1,3-butanedione
  5—4,4,4-trifluoro-1-(4-chlorophenyl)-1,3-butanedione
  6—4,4,4-trifluoro-1-(2-thienyl)-1,3-butanedione
  7—4-chloro-4,4-difluoro-1-phenyl-1,3-butanedione
  8—4,4,4-trifluoro-1-(2-benzothienyl)-1,3-butanedione
  9—4,4,4-trifluoro-1-naphthyl-1,3-butanedione
  10—4-chloro-4,4-difluoro-1-phenyl-1,3-butanedione
  11—4,4,4-trifluoro-1-(2-thienyl)-1,3-butanedione
  12—4,4,4-trichloro-1-(2-thienyl)-1,3-butanedione
  13—4,4,4-trifluoro-1-[2-(5-iodo)thienyl]-1,3-butanedione
  14—4,4,4-trichloro-1-naphthyl-1,3-butanedione
  15—heptafluoro-1-[2-(5-bromo)thienyl]-1,3-hexanedione
  16—4-fluoro-4,4-dichloro-1-[2-thienyl]-1,3-butanedione
  17—1-(2-thienyl)-1,3-hexanedione
  18—4,4,4-trifluoro-1-(2-[3-methyl]thienyl)-1,3-butanedione
  19—5,5,5-trifluoro-4,4-difluoro-1-phenyl-1,3-pentanedione
  20—5,5,5-trifluoro-4,4-difluoro-1-(2-thienyl)-1,3-pentanedione
  21—4-chloro-4,4-difluoro-1-(2-thienyl)-1,3-
  22—4,4,4-trifluoro-1-(2-benzofuranyl)-1,3-butanedione The following table illustrates the control of soil fungi by the unique fungicides of the present invention. The inoculated checks with no chemical present showed uniform dense growth of all four (4) organisms, showing that all are virile cultures. The sterile checks with no growth at all shows that the soil was not contaminated with extraneous organisms.

Two commercial fungicides Domosan and PCNB are included for comparison. The weakest compounds of the present invention are about equivalent to these commercial materials. The best are markedly superior.

TABLE I

| Composition Number | Organisms | | | | Total control points |
|---|---|---|---|---|---|
| | Rhizoct. | Sclerot. | Fusarium | Pythium | |
| 2 | 2,3 | 3,3 | 2,2 | 2,3 | 20 |
| 3 | 3,3 | 3,3 | 3,3 | 3,3 | 24 |
| 4 | 3,3 | 2,3 | 3,3 | 2,3 | 22 |
| 5 | 3,4 | 3,4 | 4,4 | 3,4 | 29 |
| 6 | 3,4 | 3,3 | 3,3 | 4,4 | 27 |
| 7 | 3,3 | 3,3 | 3,3 | 2,3 | 23 |
| 8 | 2,2 | 3,3 | 2,2 | 2,2 | 18 |
| 9 | 4,3 | 3,3 | 3,3 | 2,2 | 23 |
| 10 | 3,3 | 4,3 | 4,4 | 2,3 | 26 |
| 11 | 2,2 | 2,2 | 3,3 | 2,2 | 18 |
| 12 | 3,3 | 3,3 | 3,4 | 3,3 | 25 |
| 13 | 1,1 | 2,2 | 2,3 | 2,2 | 15 |
| 14 | 2,2 | 2,1 | 3,2 | 3,2 | 17 |
| 15 | 3,4 | 3,4 | 3,3 | 2,3 | 24 |
| 16 | 3,3 | 2,3 | 2,3 | 2,3 | 21 |
| 17 | 1,1 | 2,2 | 2,2 | 1,1 | 12 |
| 18 | 3,2 | 2,2 | 3,3 | 2,2 | 19 |
| 19 | 3,3 | 2,2 | 2,2 | 1,1 | 16 |
| 20 | 3,3 | 2,2 | 3,3 | 3,2 | 21 |
| 21 | 3,3 | 3,3 | 3,3 | 3,3 | 24 |
| 22 | 4,4 | 2,2 | 4,4 | 3,3 | 26 |
| Inoculated control | 0,0 | 0,0+ | 0,0 | 0,0 | 0 |
| Sterile control | 5,5 | 5,5 | 5,5 | 5,5 | 40 |
| Demosan [1] | 2,2 | 1,1 | 3,3 | 1,2 | 15 |
| PCNB [2] | 2,2 | 2,2 | 2,2 | 2,2 | 16 |

[1] 1-4-dichloro-2,5-dimethyl benzene.
[2] Pentachloronitrobenzene.

The copper and magnesium chelates of 4,4,4-trifluoro-1-(2-thienyl)-1,3-butanedione (also known as 2-thenoyltrifluoroacetone) are known compounds. These two materials, as well as the other metal chelates used in this invention, were made by the procedure given by Reid and Calvin, Jour. Am. Chem. Soc., 72, 2949 (1950).

Several metal chelates of 4,4,4-trifluoro-1-(2-thienyl)-1,3-butanedione were made by the Reid-Calvin procedure. These chelates were formulated and tested as in Example 1. The results are given in Table II following, from which it will be noted that the copper chelate is superior to the other chelates tested and to the unchelated compound (of Compound No. 6 in Table I).

TABLE II

| Chelate | Organisms | | | | Total control points |
|---|---|---|---|---|---|
| | Rhizoct. | Sclerot. | Fusarium | Pythium | |
| Cu(II) | 3,4 | 4,4 | 3,4 | 4,4 | 30 |
| Mg | 2,3 | 3,3 | 3,3 | 2,3 | 22 |
| Ni(II) | 2,2 | 3,3 | 2,2 | 3,2 | 19 |
| Co | 3,3 | 3,3 | 3,3 | 2,3 | 23 |
| Cd | 3,4 | 3,3 | 3,3 | 3,3 | 25 |
| Zn | 3,2 | 3,3 | 2,3 | 3,3 | 22 |
| La(III) | 3,3 | 2,3 | 3,2 | 3,3 | 22 |
| Sn(II) | 2,2 | 2,2 | 3,1 | 2,2 | 16 |

While particularly advantageous embodiments of the invention have been described and illustrated by the examples it will be recognized by those skilled in the art that various changes and modifications can be made therein without departing from the scope of the invention as defined by the appended claim.

What is claimed:

1. A method for protecting seeds, seedlings and vegetative transplants from attack by fungi which inhabit soil comprising applying to fungus infected seed or soil a fungicidally effective amount of the copper (II) chelate of 4,4,4-trifluoro-1-(2-thienyl)-1,3-butanedione.

References Cited

UNITED STATES PATENTS 2,977,279  3/1961  Kosmin _____ 424—294
3,076,834  2/1963  Norton _____ 424—294 X

OTHER REFERENCES

Reid et al., J. Am. Chem. Soc., vol. 72, pp. 2948–52 (1950).

Horsfall—"Fungicides and Their Action," pub. Chronicle Botanica Co., p. 108 (1945).

Moore et al., J. Org. Chem., vol. 29, pp. 1439–44 (1964).

ALBERT T. MEYERS, Primary Examiner

L. SCHENKMAN, Assistant Examiner

U.S. Cl. X.R.

424—275, 285, 287, 331